United States Patent
Mitchell et al.

(10) Patent No.: US 10,430,178 B2
(45) Date of Patent: Oct. 1, 2019

(54) AUTOMATED DELIVERY AND INSTALLATION OF OVER THE AIR UPDATES IN VEHICLES

(71) Applicant: GM Global Technology Operations LLC, Detroit, MI (US)

(72) Inventors: Monica E. Mitchell, Royal Oak, MI (US); Kevin M. Baltes, Wixon, MI (US); Brian J. Ciesinski, Commerce Township, MI (US); Peter M. Ansbro, Brighton, MI (US); Scott E. Jackson, Northville, MI (US); Kathleen S. McMahon, West Bloomfield, MI (US); Kelly M. Comastro, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/898,689

(22) Filed: Feb. 19, 2018

(65) Prior Publication Data
US 2019/0258466 A1 Aug. 22, 2019

(51) Int. Cl.
*G06F 8/65* (2018.01)
*H04W 4/44* (2018.01)

(52) U.S. Cl.
CPC ............. *G06F 8/65* (2013.01); *H04W 4/44* (2018.02)

(58) Field of Classification Search
CPC ..... G06F 8/60; G06F 8/61; G06F 8/65; G06F 8/67; G06F 8/68; H04W 4/44
USPC .................................................. 717/168–173
See application file for complete search history.

(56) References Cited

U.S. PATENT DOCUMENTS

| | | | |
|---|---|---|---|
| 8,856,536 B2 | 10/2014 | Rabadi et al. | |
| 8,856,538 B2 | 10/2014 | Costin et al. | |
| 8,881,308 B2 | 11/2014 | Baltes et al. | |
| 8,930,710 B2 | 1/2015 | Baltes et al. | |
| 8,966,248 B2 | 2/2015 | Baltes et al. | |
| 8,978,160 B2 | 3/2015 | Alrabady et al. | |
| 9,021,246 B2 | 4/2015 | Baltes et al. | |
| 9,270,468 B2 | 2/2016 | Alrabady et al. | |
| 9,563,418 B1 * | 2/2017 | Walton | G06F 8/654 |
| 2006/0244576 A1 * | 11/2006 | Sugie | B60R 25/1004 340/429 |

(Continued)

OTHER PUBLICATIONS

"Method to Allow Local Modification of a Secure Electronic Control Unit"; Research Disclosure database No. 579020; Published in the Jul. 2012 paper journal; Published digitally Jun. 13, 2012; www.researchdisclosure.com; 3 pages.

*Primary Examiner* — Qing Chen

(57) ABSTRACT

An updating system of a vehicle includes a communication module configured to wirelessly download an over the air (OTA) update package. The OTA update package includes: a predetermined period for beginning installation of the OTA update package; an indicator of a module and code to be updated; and replacement code. A display control module is configured to, when a transmission of the vehicle is in park and the predetermined period has not yet passed after the downloading of the OTA update package, display a message on a display within a passenger cabin of the vehicle. The message solicits user input regarding whether to: (i) begin installation of the OTA update package; or (ii) install the OTA update package at a later time.

17 Claims, 4 Drawing Sheets

(56) References Cited

U.S. PATENT DOCUMENTS

| | | | |
|---|---|---|---|
| 2009/0106580 A1* | 4/2009 | Slyz | G06F 11/1068 |
| | | | 714/5.1 |
| 2012/0200891 A1* | 8/2012 | Tokumoto | G06F 8/62 |
| | | | 358/1.15 |
| 2013/0111212 A1 | 5/2013 | Baltes et al. | |
| 2014/0075094 A1 | 3/2014 | Alrabady et al. | |
| 2014/0075517 A1 | 3/2014 | Alrabady et al. | |
| 2014/0181526 A1 | 6/2014 | Alrabady et al. | |
| 2014/0282476 A1* | 9/2014 | Ciudad | G06F 8/65 |
| | | | 717/171 |
| 2014/0282480 A1* | 9/2014 | Matthew | G06F 8/60 |
| | | | 717/172 |
| 2015/0178061 A1* | 6/2015 | Wang | G06F 8/61 |
| | | | 717/172 |
| 2016/0117162 A1* | 4/2016 | Searle | H04L 41/082 |
| | | | 717/173 |
| 2016/0146130 A1 | 5/2016 | Haskara et al. | |
| 2016/0266886 A1* | 9/2016 | Sarkar | G06F 8/65 |
| 2016/0371076 A1* | 12/2016 | Moeller | H04L 67/34 |
| 2017/0123784 A1* | 5/2017 | Zymeri | H04L 41/082 |
| 2018/0018160 A1* | 1/2018 | Teraoka | B60R 16/02 |
| 2018/0093623 A1* | 4/2018 | Terwilliger | H04L 67/34 |
| 2018/0376309 A1* | 12/2018 | Kondo | H04W 4/48 |

\* cited by examiner

AUTOMATED DELIVERY AND INSTALLATION OF OVER THE AIR UPDATES IN VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle control systems and methods and more particularly to systems and methods for downloading and installing code in vehicles.

A vehicle includes a plurality of control modules that control respective actuators of the vehicle. For example, the vehicle may include an engine control module that controls actuators of an internal combustion engine of the vehicle. The vehicle includes a transmission control module that controls actuators of a transmission of the vehicle.

A passenger of a vehicle rides within a passenger cabin (or passenger compartment) of the vehicle. An infotainment system of the vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

SUMMARY

In a feature, an updating system of a vehicle includes a communication module configured to wirelessly download an over the air (OTA) update package. The OTA update package includes: a predetermined period for beginning installation of the OTA update package; an indicator of a module and code to be updated; and replacement code. A display control module is configured to, when a transmission of the vehicle is in park and the predetermined period has not yet passed after the downloading of the OTA update package, display a message on a display within a passenger cabin of the vehicle. The message solicits user input regarding whether to: (i) begin installation of the OTA update package; or (ii) install the OTA update package at a later time.

In a feature, an installation module is configured to install the OTA update package and update the code of the module with the replacement code in response to user input to begin the installation of the OTA update package.

In a feature, an immobilization module is configured to immobilize the vehicle throughout the installation of the OTA update package.

In a feature, a transmission control module is configured to prevent shifting of the transmission out of park throughout the installation of the OTA update package.

In a feature, an engine control module is configured to prevent starting of an engine of the vehicle throughout the installation of the OTA update package.

In a feature, the installation module is configured to not begin installing the OTA update package and updating the code of the module with the replacement code in response to receipt of user input to install the OTA update package at a later time.

In a feature, a timer module is configured to: set a timer period to the predetermined period in response to the downloading of the OTA update package; and decrement the timer period as time passes after the downloading of the OTA update package, where the display control module is configured to, when the transmission of the vehicle is in park and the predetermined period has yet passed after the downloading of the OTA update package, display a second message on the display within the passenger cabin of the vehicle. The second message solicits user input regarding whether to: (i) begin installation of the OTA update package; or (ii) install the OTA update package at a next vehicle shutdown.

In a feature, a timer module is configured to: set a timer period to the predetermined period in response to the downloading of the OTA update package; and decrement the timer period as time passes after the downloading of the OTA update package, where the message further indicates that installation of the OTA update package will begin when the timer period has passed.

In a feature: a timer module is configured to: set a timer period to the predetermined period in response to the downloading of the OTA update package; and decrement the timer period as time passes after the downloading of the OTA update package; and an installation module is configured to selectively install the OTA update package and update the code of the module with the replacement code in response to a determination that the timer period is less than or equal to zero.

In a feature, an installation module is configured to, without receiving user input to install the OTA update package, install the OTA update package and update the code of the module with the replacement code in response to a determination that the predetermined period has passed.

In a feature: a first timer module is configured to: set a first timer period to the predetermined period in response to the downloading of the OTA update package; and decrement the first timer period as time passes after the downloading of the OTA update package; and a second timer module is configured to: in response to user input to begin installation of the OTA update package, set a second timer period to a second predetermined period; and decrement the second timer period as time passes after the setting of the second timer period to the second predetermined period; and an installation module is configured to install the OTA update package and update the code of the module with the replacement code when the second timer period is less than or equal to zero.

In a feature, an immobilization module is configured to immobilize the vehicle throughout the installation of the OTA update package.

In a feature, a transmission control module is configured to prevent shifting of a transmission out of park throughout the installation of the OTA update package.

In a feature, an engine control module is configured to prevent starting of an engine of the vehicle throughout the installation of the OTA update package.

In a feature, the installation module is configured to delay installing the OTA update package and updating the code of the module with the replacement code in response to a determination that the transmission has been shifted out of park when the second timer period is greater than zero.

In a feature, the installation module is configured to delay installing the OTA update package and updating the code of the module with the replacement code in response to a determination that the vehicle has been started when the second timer period is greater than zero.

In a feature, the installation module is configured to delay installing the OTA update package and updating the code of the module with the replacement code in response to receipt of user input to cancel the installation of the OTA update package when the second timer period is greater than zero.

In a feature, the display control module is configured to, in response to a lack of receipt of user input before an ignition system of the vehicle is turned off to (i) begin installation of the OTA update package or (ii) install the OTA update package at a later time, display the message on the display when the ignition system of the vehicle is next turned on.

In a feature, an updating method for a vehicle includes: by the vehicle, wirelessly downloading an over the air (OTA) update package, where the OTA update package includes: a predetermined period for beginning installation of the OTA update package; an indicator of a module and code to be updated; and replacement code; and, when a transmission of the vehicle is in park and the predetermined period has not yet passed after the downloading of the OTA update package, displaying a message on a display within a passenger cabin of the vehicle, where the message solicits user input regarding whether to: (i) begin installation of the OTA update package; or (ii) install the OTA update package at a later time.

In a feature, the updating method further includes: setting a first timer period to the predetermined period in response to the downloading of the OTA update package; decrementing the first timer period as time passes after the downloading of the OTA update package; in response to user input to begin installation of the OTA update package, setting a second timer period to a second predetermined period; decrementing the second timer period as time passes after the setting of the second timer period to the second predetermined period; and installing the OTA update package and updating the code of the module with the replacement code when the second timer period is less than or equal to zero.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
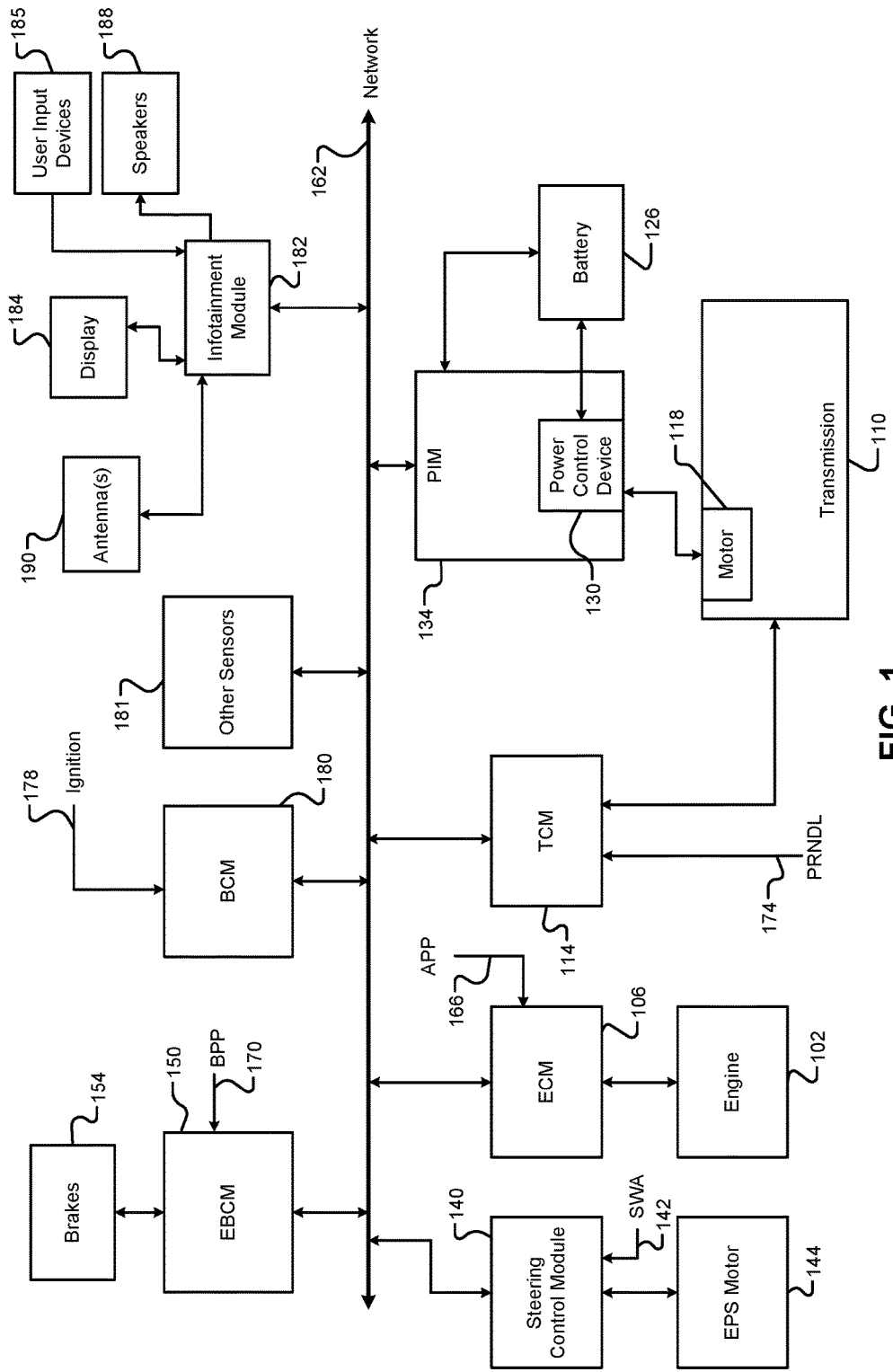
FIG. 1 is a functional block diagram of an example vehicle system.

A vehicle includes a plurality of control modules that execute respective code to execute respective vehicle functions and to control respective actuators. The control modules may share parameters and information via an in-vehicle network, such as a controller area network (CAN). The vehicle also includes one or more transceivers that wirelessly receive data, such as a WiFi transceiver, a Bluetooth transceiver, a cellular transceiver, a satellite transceiver, and/or one or more other types of transceivers.

Under some circumstances, a manufacturer of the vehicle may decide to update all or a portion of the code executed by a control module of the vehicle. The code may include software, firmware, configuration parameters, calibrated data, and other data. The vehicle wirelessly downloads an over the air (OTA) update package (e.g., a compressed software package or file) for updating the code of the control module. The OTA update package includes an executable file that is executed by a module of the vehicle to replace or modify specified code executed by the control module with replacement code included in the OTA update package. The control modules of the vehicle immobilize the vehicle (e.g., prevent shifting of a transmission out of park, prevent starting of an engine, etc.) during installation of the OTA update package.

According to the present disclosure, the OTA update package also includes a predetermined period after which the OTA update package will be installed regardless of whether user input has been received indicative of an acknowledgement and acceptance of the installation of the OTA update package. When the transmission transitions to park or is in park and the vehicle is started after receipt of the OTA update package, an infotainment module of the vehicle displays a message on a display within a passenger cabin of the vehicle.

When the predetermined period has not yet passed at vehicle startup when the transmission is in park or transitions to park, the message solicits user input regarding whether (i) to install the OTA update package at that time or (ii) to remind the user to install the OTA update package at a later time. In response to user input to install the OTA update package at that time, the vehicle shuts down and begins installation when a second predetermined period has passed unless the transmission is transitioned out of park or user input is received to cancel the installation at that time. When the predetermined period has passed at vehicle startup when the transmission is in park, the message solicits user input regarding whether (i) to install the OTA update package at that time or (ii) to install the OTA update package when the vehicle is next shut down.

The installation module therefore automatically begins installing OTA update packages within approximately the predetermined period regardless of whether user input has received accepting and acknowledging installation of the OTA update package. OTA updates can begin installation sooner than the predetermined period, however, in response to user input. The above also allows a user the flexibility to delay installation of an OTA update (until the predetermined period has passed).

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, semi-autonomous vehicles, non-autonomous vehicles, and other types of vehicles.

An engine 102 combusts an air/fuel mixture to generate drive torque. An engine control module (ECM) 106 controls the engine 102 based on a torque request, such as a torque request determined based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a network 162, such as a controller area network (CAN). In vehicles, CAN may also stand for car area network. The network 162 may include one or more data buses. Various parameters may be made available by a given control module to other control modules via the network 162.

The driver inputs may include, for example, an accelerator pedal position (APP) 166 which may be provided to the ECM 106. A brake pedal position (BPP) 170 may be provided to the EBCM 150. A position 174 of a range selector, such as a park, reverse, neutral, drive lever (PRNDL), may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle may also include one or more other sensors 181. Examples of the other sensors 181 include, for example, one or more laser imaging distancing and radar (LIDAR) sensors, one or more radar sensors, one or more cameras, and one or more sonar sensors. One or more control modules may control respective devices based on input from one or more of the one or more other sensors 181. For example, based on input from one or more of the one or more other sensors 181, the ECM 106 may control the engine 102, the steering control module 140 may control the EPS motor 144, and/or the EBCM 150 may control the brakes 154.

The vehicle system also includes an infotainment module 182. The infotainment module 182 controls what is displayed on a display 184. The display 184 may be a touchscreen display in various implementations and transmit signals indicative of user input to the display 184 to the infotainment module 182. The Infotainment module 182 may additionally or alternatively receive signals indicative of user input from one or more other user input devices 185, such as one or more switches, buttons, knobs, etc.

The infotainment module 182 may also generate output via one or more other devices. For example, the infotainment module 182 may output sound via one or more speakers 188 of the vehicle. The vehicle may include one or more additional control modules that are not shown, such as a chassis control module, a battery pack control module, etc. The vehicle may omit one or more of the control modules shown and discussed.

The vehicle (e.g., the infotainment module 182) includes one or more transceivers that wirelessly receive information from and transmit information via one or more antennas 190 of the vehicle. Examples of transceivers include, for example, cellular transceivers, WiFi transceivers, satellite transceivers, and other types of transceivers.

For example, a transceiver may wirelessly receive information from and transmit information to a server, such as a server of the manufacturer of the vehicle. The transceiver may, for example, receive an over the air (OTA) update package (e.g., in the form of a compressed software package or file) from a server of the manufacturer of the vehicle. The OTA update package includes updated code for replacing or modifying code of one or more modules of the vehicle. One or more control modules of the vehicle (e.g., of the infotainment module 182) execute and install the OTA update package including updating the code of the one or more modules that is to be updated. The one or more control modules also immobilize the vehicle during execution and installation of the OTA package.

Figure 2:
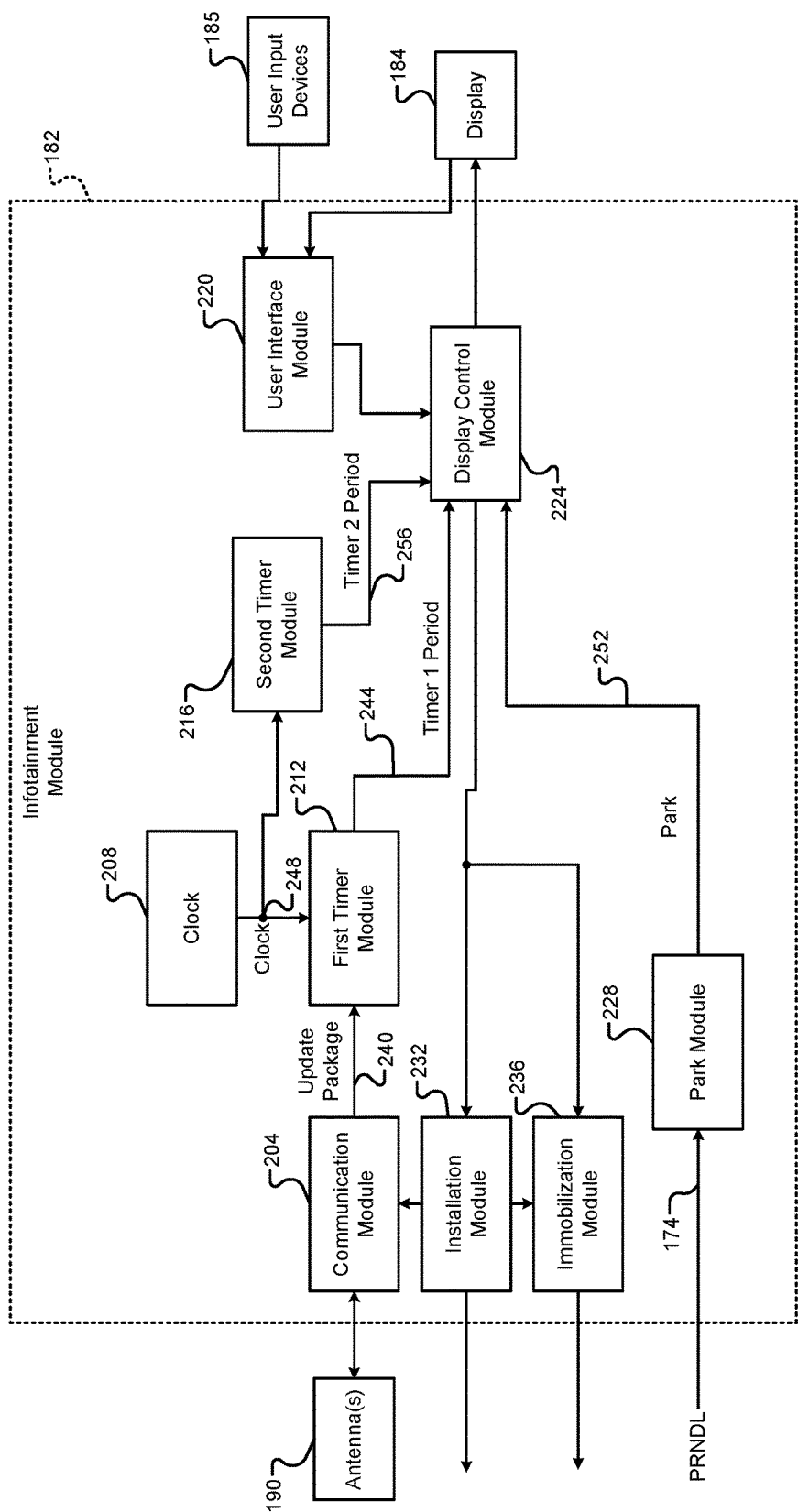
FIG. 2 is a functional block diagram of an example implementation of an infotainment module.

FIG. 2 is a functional block diagram of an example implementation of the infotainment module 182. The infotainment module 182 may include a communication module 204, a clock 208, a first timer module 212, a second timer module 216, a user interface module 220, and a display control module 224. The infotainment module 182 may also include a transition module 228, an installation module 232, and an immobilization module 236. While the example of the infotainment module 182 is shown and will be discussed, one or more of the components of FIG. 2 may be implemented in another module or independently.

The communication module 204 includes one or more transceivers that wirelessly download or receive an OTA update package 240. Examples of transceivers include, for example, cellular transceivers, WiFi transceivers, satellite transceivers, and other types of transceivers. For example, the communication module 204 may download the OTA update package 240 from the server in response to receipt of a request or notification from the server that the OTA update package 240 is available for downloading.

The OTA update package 240 may be, for example a compressed software package or file (e.g., a .zip file). The OTA update package 240 includes a predetermined period until a mandatory installation of the OTA update package 240 and code to update (e.g., replace or modify) code of one or more specified modules of the vehicle. The predetermined period may be calibratable and may be set, for example, by the manufacturer of the vehicle. In various implementations, the predetermined period may be set to zero to force the OTA update package 240 to be installed as soon as possible.

The first timer module 212 initializes a first timer period (Timer 1 Period) 244 to the predetermined period when the OTA update package 240 is received. The first timer module 212 decrements the first timer period as time passes. For example, the first timer module 212 may decrement the first timer period 244 (e.g., by one) each time a clock signal 248 is generated by the clock 208. The clock 208 generates the clock signal 248 at a predetermined frequency, such as one per second, minute, or hour.

The display control module 224 controls what is displayed on the display 184. For example, the display control module 224 may display infotainment related information on the display 184 when the transmission 110 is in drive, for example, as indicated by the position 174 of the range selector. When the transmission 110 is in reverse, the display control module 224 may display video on the display 184 from a rear facing camera of the vehicle. The rear facing camera captures images within a FOV behind the vehicle.

When the first timer period 244 is greater than zero and the transmission 110 is in park at vehicle startup or the transmission 110 transitions to park, the display control module 224 displays a message on the display 184 that notifies the user of the impending installation of the OTA update package 240 in a period equal to the first timer period 244. The park module 228 generates a park signal 252 that indicates when the transmission 110 is in park. For example, the park module 228 may generate the park signal 252 when the position 174 of the range selector transitions from another position to a predetermined position where the TCM 114 will shift the transmission 110 to park. In various implementations, the TCM 114 may report whether the transmission 110 is in park. Vehicle startup may be indicated, for example, by the ignition state 178 transitioning from off to one of accessory, run, or crank. Vehicle shutdown may be indicated, for example, by the ignition state 178 transitioning to off.

The displayed message (when the transmission 110 is in park at vehicle startup or the transmission 110 transitions to park and the first timer period 244 is greater than zero) also requests user input regarding whether (i) to accept and install the OTA update package 240 at that time or (ii) to generate a reminder and install the OTA update package 240 at a later time. The message may also include other information, such as an indication that the vehicle will be immobilized during the installation and that one, more than one, or all vehicle functions will be disabled during the installation. The display control module 224 may display the message until: (i) user input is received to accept and install the OTA update package 240 at that time; or (ii) user input is received to generate a reminder and install the OTA update package 240 at a later time.

The user interface module 220 provides input indicative of user input to the display control module 224. The user interface module 220 may provide the input to the display control module 224 based on user input (e.g., actuation or touching) to the user input devices 185 and/or user input (e.g., actuation or touching) to the display 184.

In response to receipt of (i) input indicative of user input to accept and install the OTA update package 240 at that time, the display control module 224 prompts the installation module 232 to install the OTA update package 240. The immobilization module 236 shuts down the vehicle, immobilizes the vehicle, and prevents actuation of various vehicle actuators during the installation of the OTA update package 240. For example, the immobilization module 236 prevents the TCM 114 from shifting the transmission 110 from park. Additionally or alternatively, the immobilization module 236 prevents the ECM 106 from starting of the engine 102 (e.g., via preventing application of power to a starter motor and/or a starter actuator). Additionally or alternatively, the immobilization module 236 prevents one or more other modules from actuating one or more respective actuators.

When the first timer period 244 is less than zero or equal to and the transmission 110 is in park at vehicle startup, the display control module 224 displays a second message on the display 184 that notifies the user of the impending installation of the OTA update package 240. The second message (when the transmission 110 is in park at vehicle startup and the first timer period 244 is less than or equal to zero) also requests user input regarding whether (i) to accept and install the OTA update package 240 at that time or (ii) to install the OTA update package 240 at the next vehicle shutdown. The second message may also include other information, such as an indication that the vehicle will be immobilized during the installation and that one, more than one, or all vehicle functions will be disabled during the installation. The display control module 224 may display the second message until: (i) user input is received to accept and install the OTA update package 240 at that time; or (ii) user input is received to install the OTA update package at the next vehicle shutdown.

In response to user input to accept and install the OTA update package 2240 at that time or at the next vehicle shutdown when the first timer period 244 is less than or equal to zero, the second timer module 216 initializes a second timer period (Timer 2 Period) 256 to a second predetermined period. The second timer module 216 decrements the second timer period 256 as time passes. For example, the second timer module 216 may decrement the second timer period 256 (e.g., by one) each time the clock signal 248 is generated by the clock 208.

While the second timer period 256 is greater than zero, the display control module 224 displays a message on the display 184 that notifies the user that the OTA update package 240 will begin being installed and the vehicle will be immobilized in a period equal to the second timer period 256. The message displayed may also indicate an opportunity to abort during the second predetermined period, for example, by providing user input abort the installation, starting the vehicle, or transitioning the transmission 110 out of park. In response to the second timer period 256 reaching zero, the display control module 224 prompts the installation module 232 to install the OTA update package 240.

The installation module 232 begins installing the OTA update package 240 in response to being prompted. Installing the OTA update package 240 includes the installation module 232 executing an executable file within the OTA update package 240 and updating the code of the module(s) specified in the OTA update package 240 using code within the OTA update package 240.

Figure 3A:
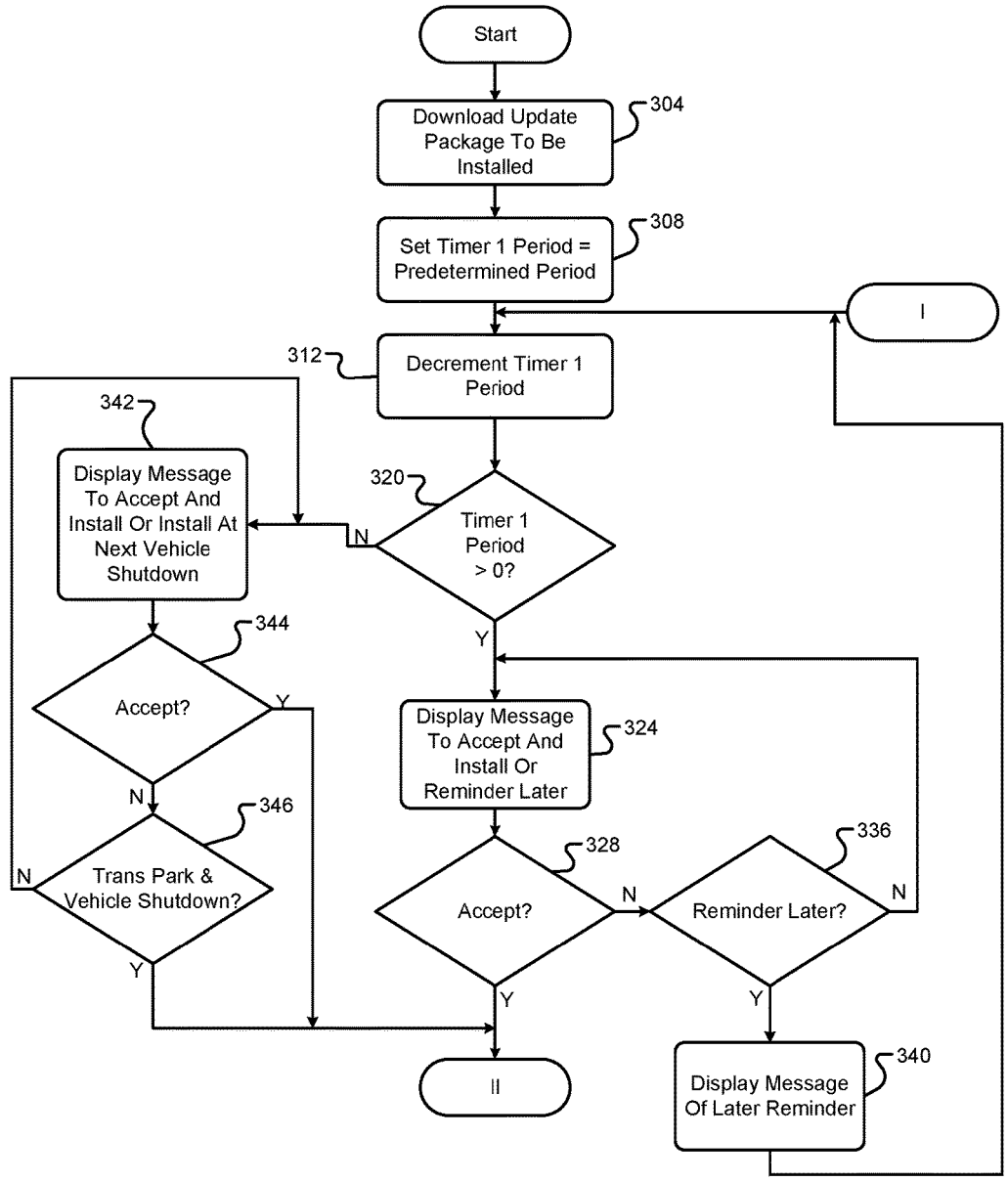
FIGS. 3A and 3B include a flowchart depicting an example method of controlling installation of an over the air (OTA) update package.
Figure 3B:
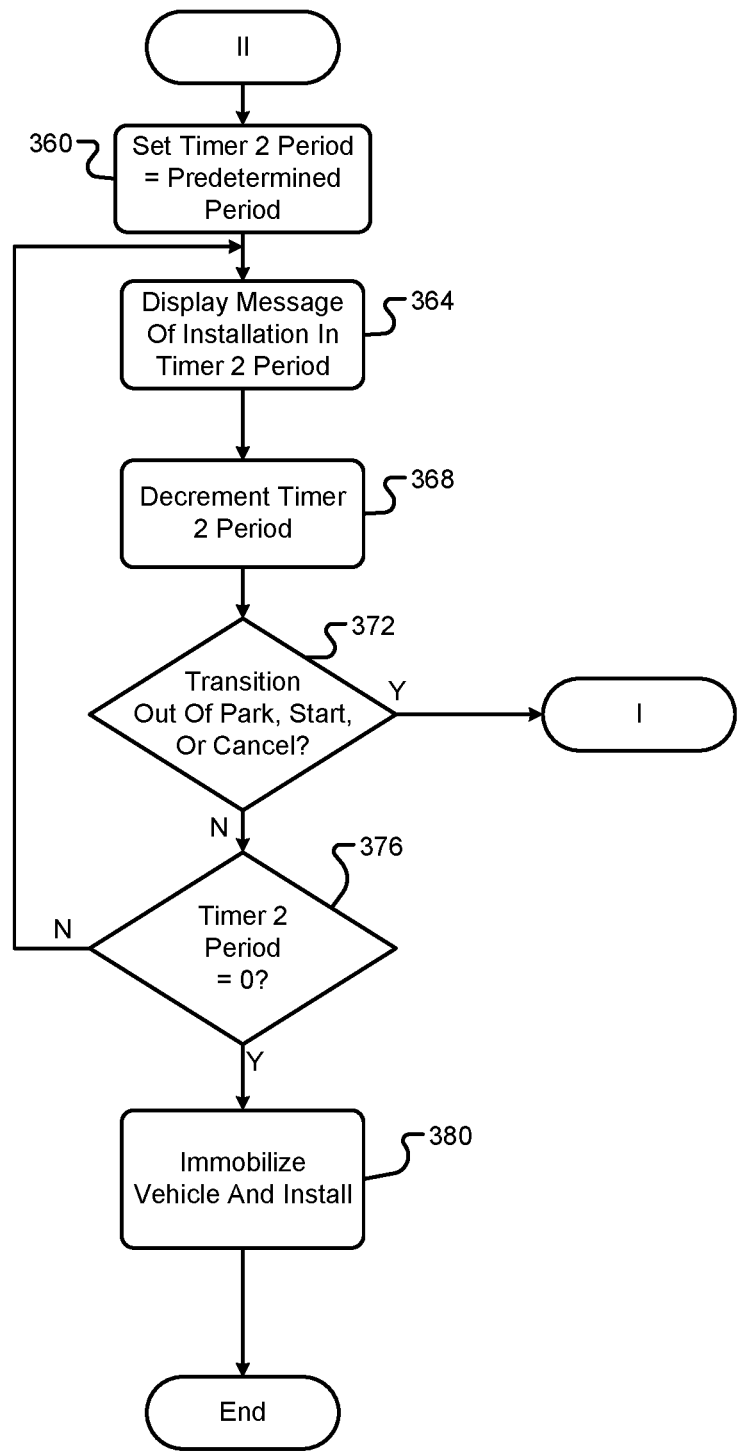

FIGS. 3A-3B are a flowchart depicting an example method of controlling installation of a downloaded OTA update package. Referring to FIG. 3A, control may begin with 304 at vehicle startup (e.g., when the ignition state 178 is run or crank) when the transmission 110 is in park or the transmission 110 transitions to park. At 304, the communication module 204 downloads the OTA update package 240. In various implementations, the communication module 204 may download the OTA update package 240 while the vehicle is off.

At 308, the first timer module 212 sets the first timer period 244 to the predetermined period specified in the OTA update package 240. More specifically, the first timer module 212 sets the first timer period 244 to the predetermined period when the OTA update package 240 is downloaded.

At 312, the first timer module 212 may decrement the first timer period 244 (e.g., by 1). While the example of setting the first and second timer periods 244 and 256 to predetermined periods and decrementing the first and second timer periods 244 and 256 is provided, the present disclosure is also applicable to setting the first and second timer periods 244 and 256 to zero and determining whether the first and second timer periods 244 and 256 are greater than the respective predetermined periods.

At 320, the display control module 224 determines whether the first timer period 244 is greater than zero. If 320 is true, control continues with 324. If 320 is false, control transfers to 342, which is discussed further below. At 324, the display control module 224 displays on the display 184 the message questing whether (i) to accept and install the OTA update package 240 at that time or (ii) to generate a reminder and install the OTA update package 240 at a later time. The message may also include other information, such as an indication that the vehicle will be immobilized during the installation and that one, more than one, or all vehicle functions will be disabled during the installation.

At 328, the display control module 224 determines whether the input has been received indicative of (i) user input to accept and install the OTA update package 240. If 328 is true, control continues with 360 (FIG. 3B), which is discussed further below. If 328 is false, control transfers to 336.

At 336, the display control module 224 determines whether the input has been received indicative of (ii) user input to generate a reminder and install the OTA update package 240 at a later time. If 336 is true, control continues with 340. If 336 is false, control returns to 324 and the display control module 224 continues to display the message until user input to accept and install is received, the first timer period 320 reaches zero, or user input to generate a reminder and install the OTA update package 240 at a later time is received. At 340, the display control module 224 may display a message on the display acknowledging the request and indicating that a reminder to install the OTA update package 240 will be issued at a later time, and control may return to 312.

At 342, the display control module 224 displays on the display 184 the message questing whether (i) to accept and install the OTA update package 240 at that time or (ii) install the OTA update package 240 when the vehicle is next shut down. The message may also include other information, such as an indication that the vehicle will be immobilized during the installation and that one, more than one, or all vehicle functions will be disabled during the installation. Vehicle shutdown may be indicated, for example, by the ignition state 178 transitioning to off.

At 344, the display control module 224 determines whether the input has been received indicative of (i) user input to accept and install the OTA update package 240. If 344 is true, control continues with 360 (FIG. 3B), which is discussed further below. If 344 is false, control may continue with 346.

At 346, the display control module 244 may determine whether the transmission 110 is in park and the vehicle has been shut down. Vehicle shutdown may be indicated, for example, by the ignition state 178 transitioning to off. If 346 is true, control continues with 360 (FIG. 3B), which is discussed further below. If 346 is false, control may return to 342 and the display control module 224 continues to display the message until user input to accept and install is received or user input to install the OTA update package 240 at the next vehicle shutdown is received.

Referring now to FIG. 3B, at 360 the second timer module 216 sets the second timer period 256 to the second predetermined period. The second predetermined period is calibratable and may be set, for example, by the manufacturer of the vehicle. In various implementations, the second predetermined period may be set to one minute or another suitable period.

At 364, the display control module 224 displays a message on the display 184 indicating that the installation of the OTA update package 240 will begin in the period corresponding to the second timer period 256. The second timer module 216 decrements the second timer period 256 at 368. At 372, the display control module 224 determines whether the transmission has been shifted from park, the vehicle has been started, or user input to cancel (or abort) the installation of the OTA update package 240 has been received. If 372 is true, control may return to 312 (FIG. 3A). If 372 is false, control may continue with 376.

At 376, the display control module 224 determines whether the second timer period 256 is less than or equal to zero. If 376 is true, controls continues with 380. If 376 is false, control returns to 364. At 380, the installation module 232 installs the OTA update package 240 and the immobilization module 236 immobilizes the vehicle and prevents actuation of various vehicle actuators during the installation of the OTA update package 240. For example, the immobilization module 236 prevents the TCM 114 from shifting the transmission 110 from park. Additionally or alternatively, the immobilization module 236 prevents the ECM 106 from starting of the engine 102 (e.g., via preventing application of power to a starter motor and/or a starter actuator). Additionally or alternatively, the immobilization module 236 prevents one or more other modules from actuating one or more respective actuators. Installing the OTA update package 240 includes the installation module 232 executing an executable file within the OTA update package 240 and updating the code of the module(s) specified in the OTA update package 240 using code of the OTA update package 240.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to,"

"on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An updating system of a vehicle, comprising:
a communication module configured to wirelessly download an over the air (OTA) update package,
wherein the OTA update package includes:
a first predetermined period for beginning installation of the OTA update package;
an indicator of a module and code of the module to be updated; and
replacement code of the module to be updated;
a display control module configured to, when a transmission of the vehicle is in park and the first predetermined period has not yet passed after the downloading of the OTA update package has completed, display a first message on a display within a passenger cabin of the vehicle,
wherein the first message solicits a user input regarding whether to:
(i) begin installation of the OTA update package; or
(ii) install the OTA update package at a later time;
a first timer module configured to:
set a first timer period to the first predetermined period in response to the downloading of the OTA update package has completed; and
decrement the first timer period as time passes after the downloading of the OTA update package has completed;
a second timer module configured to:
in response to receipt of the user input to begin installation of the OTA update package, set a second timer period to a second predetermined period; and
decrement the second timer period as time passes after the setting of the second timer period to the second predetermined period; and
an installation module configured to install the OTA update package and update the code of the module with the replacement code of the module when the second timer period is less than or equal to zero.

2. The updating system of claim 1 wherein the installation module is further configured to install the OTA update package and update the code of the module with the replacement code of the module in response to receipt of the user input to begin the installation of the OTA update package.

3. The updating system of claim 2 further comprising an immobilization module configured to immobilize the vehicle throughout the installation of the OTA update package.

4. The updating system of claim 2 further comprising a transmission control module configured to prevent shifting of the transmission of the vehicle out of park throughout the installation of the OTA update package.

5. The updating system of claim 2 further comprising an engine control module configured to prevent starting of an engine of the vehicle throughout the installation of the OTA update package.

6. The updating system of claim 2 wherein the installation module is further configured to not begin installing the OTA update package and updating the code of the module with the replacement code of the module in response to receipt of the user input to install the OTA update package at a later time.

7. The updating system of claim 1 wherein the display control module is further configured to, when the transmission of the vehicle is in park and the first predetermined period has not yet passed after the downloading of the OTA update package has completed, display a second message on the display within the passenger cabin of the vehicle,
wherein the second message solicits a user input regarding whether to:
(i) begin installation of the OTA update package; or
(ii) install the OTA update package at a next vehicle shutdown.

8. The updating system of claim 1 wherein the first message further indicates that installation of the OTA update package will begin when the first timer period has passed.

9. The updating system of claim 1 wherein the installation module is further configured to, without receiving the user input to begin the installation of the OTA update package, install the OTA update package and update the code of the module with the replacement code of the module in response to a determination that the first predetermined period has passed.

10. The updating system of claim 1 further comprising an immobilization module configured to immobilize the vehicle throughout the installation of the OTA update package.

11. The updating system of claim 1 wherein the installation module is further configured to delay installing the OTA update package and updating the code of the module with the replacement code of the module in response to a determination that the transmission of the vehicle has been shifted out of park when the second timer period is greater than zero.

12. The updating system of claim 1 wherein the installation module is further configured to delay installing the OTA update package and updating the code of the module with the replacement code of the module in response to a determination that the vehicle has been started when the second timer period is greater than zero.

13. The updating system of claim 1 wherein the installation module is further configured to delay installing the OTA update package and updating the code of the module with the replacement code of the module in response to receipt of a user input to cancel the installation of the OTA update package when the second timer period is greater than zero.

14. The updating system of claim 1 further comprising a transmission control module configured to prevent shifting of the transmission of the vehicle out of park throughout the installation of the OTA update package.

15. The updating system of claim 14 further comprising an engine control module configured to prevent starting of an engine of the vehicle throughout the installation of the OTA update package.

16. The updating system of claim 1 wherein the display control module is further configured to, in response to a lack of receipt of a user input before an ignition system of the vehicle is turned off to (i) begin installation of the OTA update package or (ii) install the OTA update package at a later time, display the first message on the display within the passenger cabin of the vehicle when the ignition system of the vehicle is next turned on.

17. An updating method for a vehicle, comprising:
by the vehicle, wirelessly downloading an over the air (OTA) update package,
wherein the OTA update package includes:
a first predetermined period for beginning installation of the OTA update package;
an indicator of a module and code of the module to be updated; and
replacement code of the module to be updated;
when a transmission of the vehicle is in park and the first predetermined period has not yet passed after the downloading of the OTA update package has completed, displaying a message on a display within a passenger cabin of the vehicle,
wherein the message solicits a user input regarding whether to:
(i) begin installation of the OTA update package; or
(ii) install the OTA update package at a later time;
setting a first timer period to the first predetermined period in response to the downloading of the OTA update package has completed;
decrementing the first timer period as time passes after the downloading of the OTA update package has completed;

in response to receipt of the user input to begin installation of the OTA update package, setting a second timer period to a second predetermined period;

decrementing the second timer period as time passes after the setting of the second timer period to the second predetermined period; and installing the OTA update package and updating the code of the module with the replacement code of the module when the second timer period is less than or equal to zero.

\* \* \* \* \*